J. T. FLYNN.
Safety Attachment for Barrels.

No. 222,029. Patented Nov. 25, 1879.

Attest:
Courtney A. Cooper.
William Paxton.

Inventor
J. T. Flynn
By his attorney
Charles E. Foster

UNITED STATES PATENT OFFICE.

JOHN T. FLYNN, OF WOONSOCKET, RHODE ISLAND.

IMPROVEMENT IN SAFETY ATTACHMENTS FOR BARRELS.

Specification forming part of Letters Patent No. 222,029, dated November 25, 1879; application filed July 29, 1879.

*To all whom it may concern:*

Be it known that I, JOHN T. FLYNN, of Woonsocket, Providence county, State of Rhode Island, have invented a new and useful Safety Attachment for Barrels, of which the following is the specification.

My invention is a safety attachment for barrels intended to prevent the access of air to the barrel, which results from the displacement of the ordinary bung, to facilitate the withdrawal of the liquor without waste, and protect the outlet.

Figure 1:
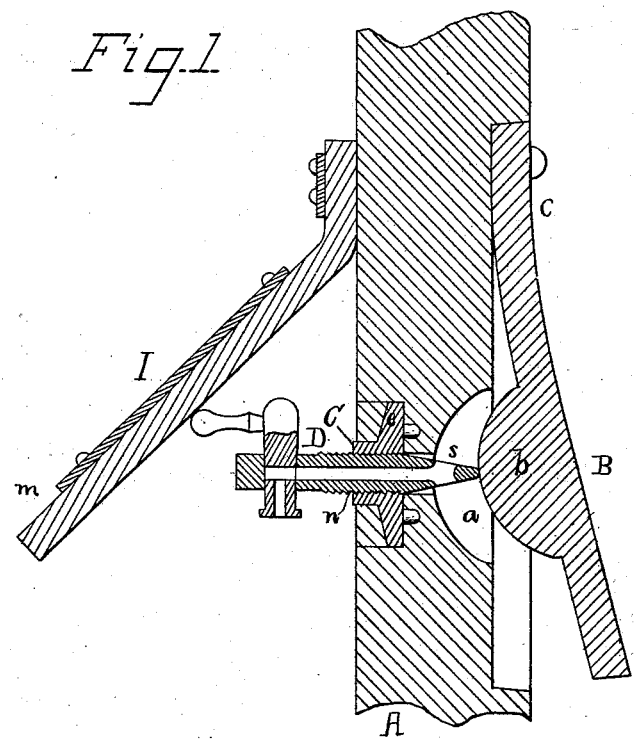
Figure 2:
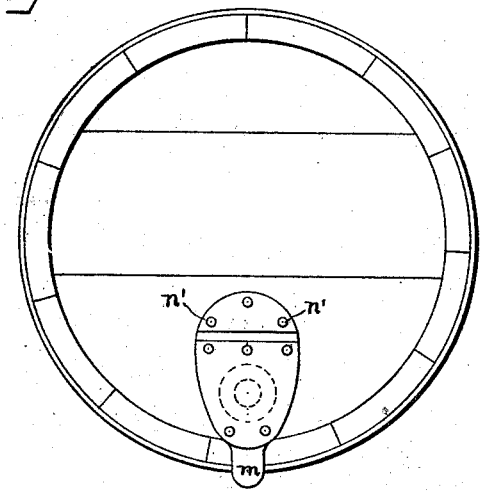

In the drawings, forming part of this specification, Figure 1 is a view, in section, representing a barrel with my improvement; and Fig. 2 a front view reduced in size.

A is the barrel-head, in the inner side of which is a rounded recess, $a$, adapted to a semi-spherical projection, $b$, on a rubber valve, B, a tongue, $c$, of which is fastened in a recess, the tendency of the valve being to spring outward and keep the projection $b$ in the recess $a$. An opening is bored through the barrel-head central with the recess $a$, to which opening is fitted a cylinder, C, having a flange, $e$, through which pass the retaining-screws. In the cylinder is a central threaded opening, $n$, to which is adapted the threaded portion of a tubular screw-faucet, D, having an unthreaded projection, $s$, at the inner end.

When the faucet is not in place the barrel may be filled by passing the liquor through the cylinder C in the same manner as through an ordinary bung-hole, the valve yielding to permit its entrance.

On the removal of pressure from the outside the pressure of the liquid or gas within will force the projection $b$ into its seat or against the end of the cylinder, thus closing the outlet and sealing the barrel.

When the faucet is introduced and its end brought against the valve, a partial turn will slightly open the valve, so that the liquor may be drawn slowly; but a further turn in the same direction will insure a free discharge. By turning the faucet in the reverse direction the valve will be closed.

In order to protect and close the cylinder C, I may use a rubber cover piece or cap, H, consisting of a piece of rubber, secured at the upper end by screws $n'$ $n'$ to the head of the barrel, and having a tongue, $m$, by which it may be lifted. When not raised the resiliency of the rubber will keep the cap closely down upon the cylinder and close the same.

It will be seen that the device serves the purpose of safety-valve, bung, and faucet, applicable to all kinds of barrels for holding liquids.

I am aware that metal clap-valves have been used inside of barrels, &c., but they are liable to rust at the hinges and become inoperative. My improved rubber valve has no hinges and is not open to this objection.

I am aware that it is old to provide barrels with outside covers for closing the faucet-holes when the faucet is not in, and I do not claim this broadly.

I claim—

1. The combination of the head or stave A, having a recess, $a$, the self-acting rubber valve B, adapted to said recess, the threaded cylinder C, and screw-faucet D, adapted thereto, substantially as set forth.

2. The combination, with the cylinder C, of an outer rubber cap, substantially as set forth.

In testimony whereof I have signed my name to this specification in the presence of two subscribing witnesses.

JOHN T. FLYNN.

Witnesses:
 RODNEY I. COOK,
 HENRY C. LAZELLE.